Fig. 1

|  | $D_1$ | $T_{12}$ | $T_{17}$ | $T_{19}$ | $T_{72}$ | $T_{95}$ |
|---|---|---|---|---|---|---|

$D_1$ $T_{12}$     $T_{17}$     $T_{19}$     $T_{72}$     $T_{95}$ $T_{12}\ T_{17}$     $T_{12}\ T_{19}$     $T_{12}\ T_{72}$     $T_{12}\ T_{95}$     $T_{12}$
$T_{17}\ T_{19}$     $T_{17}\ T_{72}$     $T_{17}\ T_{95}$
$T_{19}\ T_{72}$     $T_{19}\ T_{95}$     $T_{19}\ T_{95}$ $T_{12}\ T_{17}\ T_{19}$     $T_{12}\ T_{17}\ T_{95}$     $T_{12}\ T_{17}\ T_{95}$     $T_{12}\ T_{19}\ T_{95}$
$T_{17}\ T_{19}\ T_{72}$     $T_{17}\ T_{19}\ T_{95}$     $T_{17}\ T_{72}\ T_{95}$     $T_{12}\ T_{17}\ T_{72}$
$T_{19}\ T_{72}\ T_{95}$     $T_{12}\ T_{19}\ T_{72}$     $T_{12}\ T_{72}\ T_{95}$     ETC.

| TERMS | DOCUMENTS |
|---|---|
| 2135    HIGH FREQUENCY | |
| 2135. 2930. 4371. 5731. | 10; 271; 400; 1237; 1222; 1555; 20.320 |
| 2135. 2930. 4371. 8700. | 250; 771; 937; 237; 836; 900.210 |
| 2135. 2930. 5760. 5675. | |
| 2135. 2930. 3971. | |
| 2135. 2930. 5121. | |
| 2135. 2989. | |
| 2135. 3120. 1701. | |
| 2135. 3120. 1935. | |

Fig. 3

$(T_1\ T_3\ T_7)$ _____ $(T_{25}\ T_{37}\ T_{89}\ T_{112})$     FRAME 00/00 SHEET 1.
$(T_{25}\ T_{37}\ T_{89}\ T_{112})$ _____ $(T_{31}\ T_{52})$     FRAME 00/01 SHEET 1.
    FRAME 00/02 SHEET 2.
         ETC.

INVENTOR
F. Jonker & W. Gingras

BY Homer R Montague
ATTORNEY

INVENTOR
F. Jonker & W. Gingras
BY Homer R. Montague
ATTORNEY

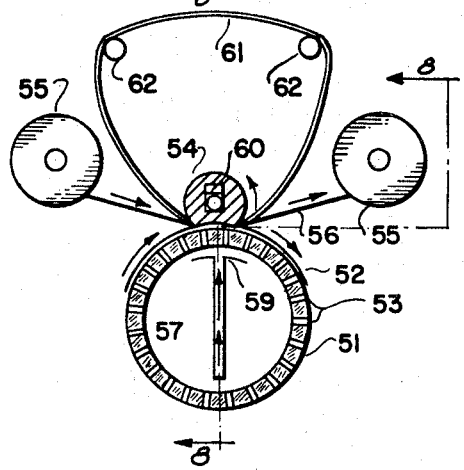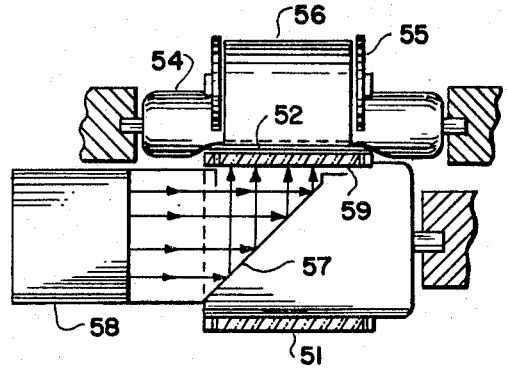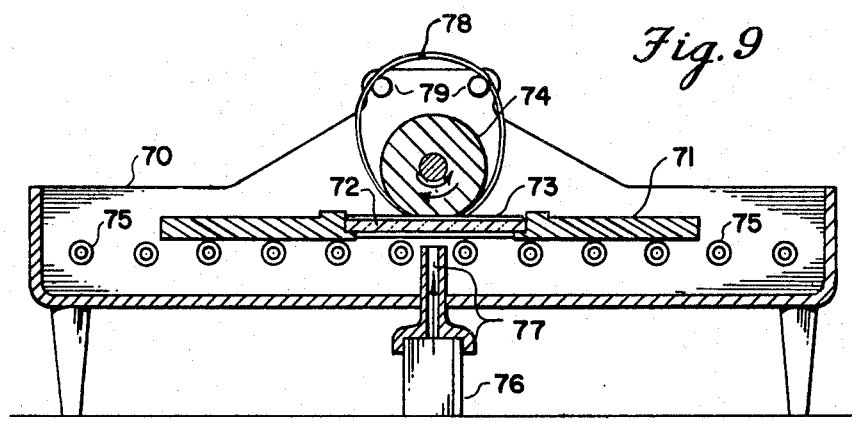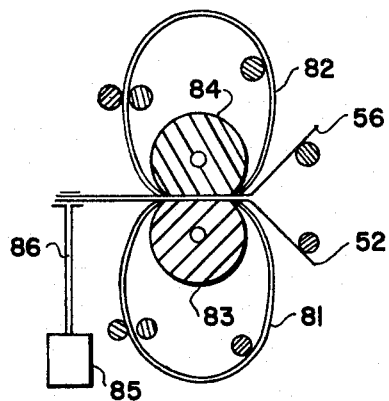

July 2, 1968   F. JONKER ET AL   3,390,608
SYSTEM FOR COMPUTER GENERATED DISSEMINABLE INDEXES
Original Filed Nov. 14, 1962   6 Sheets-Sheet 4

INVENTOR
F. Jonker & W. Gingras

BY Homer R. Montague
ATTORNEY

July 2, 1968   F. JONKER ET AL   3,390,608
SYSTEM FOR COMPUTER GENERATED DISSEMINABLE INDEXES
Original Filed Nov. 14, 1962   6 Sheets-Sheet 5

INVENTOR
F. Jonker & W. Gingras

BY
ATTORNEY

July 2, 1968   F. JONKER ETAL   3,390,608
SYSTEM FOR COMPUTER GENERATED DISSEMINABLE INDEXES
Original Filed Nov. 14, 1962   6 Sheets-Sheet 6

INVENTOR
F. Jonker & W. Gingras

BY Homer R. Montague
ATTORNEY

United States Patent Office 3,390,608
Patented July 2, 1968

3,390,608
SYSTEM FOR COMPUTER GENERATED
DISSEMINABLE INDEXES
Frederick Jonker, Washington, D.C., and William P. Gingras, Rockville, Md., assignors to Jonker Business Machines, Inc., a corporation of Delaware
Original application Nov. 14, 1962, Ser. No. 237,704, now Patent No. 3,244,067. Divided and this application Apr. 1, 1966, Ser. No. 570,100
3 Claims. (Cl. 88—24)

ABSTRACT OF THE DISCLOSURE

Photographic apparatus for converting documentary information from hardcopy originals or serial frame microfilms to rectangular matrix arrays of images, or alternatively from rectangular matrix arrays to camera film form, under control of a card or tape data reader establishing the correspondence of successive image positions in the matrix to the order of projection of items of such documentary information. A pair of orthogonally-movable carriages, one carrying the other, are driven by individual servos to establish a matrix position of one carriage relative to an optical projection axis, and said one carriage supports a matrix film (either a developed microfilm matrix film or a sensitive film sheet). Means are provided to selectively mount a serial microfilm camera or projector on the said optical projection axis for the projection of images along said axis, said means also mounting reflective means for alternatively projecting document images from hardcopy originals along said axis toward said matrix film. To control the succession of positions of said matrix film images on said optical axis, electrical output signals from the card or tape reader drive the respective carriage servos as well as, in the case of serial microfilm projection onto the matrix film, a servo which positions the microfilm of said projector at a specified film frame for each matrix exposure position.

---

This application is a division of Ser. No. 237,704, filed Nov. 14, 1962, now Patent No. 3,244,067.

This invention is concerned with information retrieval, hereafter referred to as I.R. In I.R. each document is generally indexed by anywhere from five to twenty-five keywords or key concepts generally referred to as terms. Usually there is a vocabulary of up to 5,000 terms, from which the terms by which a particular document is indexed, can be selected. In searching a collection, we phrase the search questions as a combination of terms. Usually two to six terms will adequately phrase a search question.

Information collections may be quite large. Accretion and obsoletion each may be as much as one million documents a year. The average useful life of a document may be five years. Thus collections of five million documents must be anticipated. Such collections may have to answer from one to several thousand search questions a day. Most of the originators of these search questions are remotely located over the entire country.

The only presently available solution is a large centrally located computer-like search device that can be remotely interrogated by telephone or data phone or other electronic remote link systems. However, the cost of such a system is extremely high. Each search may involve a trial and error process, as a search may give thousands of answers or no answers and may have to be rephrased to give the right amount of answers. Thus searches cannot be performed in batches but must be performed immediately and instantaneously. The cost of these repeated searches in computer time and cost of the remote link is prohibitively high.

Proposed solution

A search problem of this magnitude can only be solved by decentralization of the search by means of the dissemination of indexes to all potential users of the information. Such an index should be able to provide complete searches of a few million documents in a few minutes. According to the invention, the answer to this problem is to have a computer perform all searches by all possible combinations of terms any user may ever require, and to record and disseminate these answers in alpha-numerical form.

The publication of this index should be based on a high degree of consolidation rather than accumulation. If the index were built up by accumulation of quarterly issues, a search of a five-year collection would involve $4 \times 5 = 20$ separate searches. The ideal would be to issue a consolidated index every year, to the total collection, in which index obsolete documents have been removed and new accretions have been added. If this would be too costly, a consolidated annual index could be published every year, so that a search of the five-year collection would require only five searches.

Such indexes cannot possibly be disseminated in hard copy. To bring the cost and bulk and time duplication in quantity down to acceptable proportions the index will, according to the invention, have to be disseminated in microform based on very high reduction ratios.

The invention comprises methods of organizing the search data in the form of a searchable index and microfilm input and readout devices to store said search data in microform.

Figures

The manner in which the invention can be performed will be described with reference to the following figures:

FIG. 1 shows the combinations of terms by which a document can be listed in the index.

FIG. 2 shows a sample of a page of the index.

FIG. 3 shows a sample of the guide to the index.

FIGS. 7, 8, 9 and 10 show three versions of the reproducer.

The Index

Figure 4:
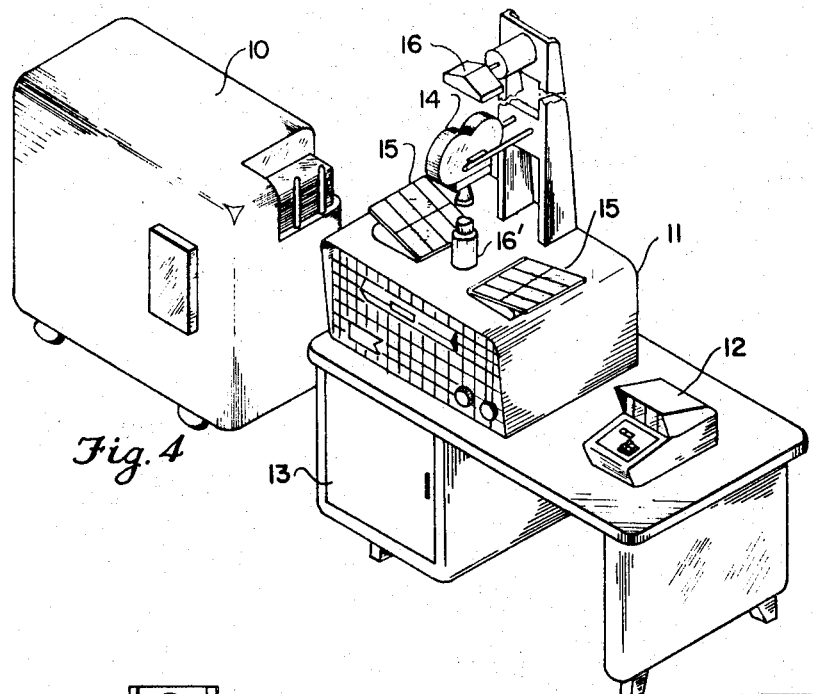
FIG. 4 shows a perspective view of the data input camera.

Even in microform the utmost space economy will have to be observed. It is, therefore, advisable that the microform index utilize only serial numbers for terms as well as for documents.

In that case it would list terms and combinations of terms in groups of two, three or more as combinations of numbers as shown in FIG. 1. Behind these the corresponding documents will be listed by number only as shown in FIG. 2.

All term numbers and combinations of term numbers will be listed in numerically ascending order. This will entail slight inconveniences in searching, but reduces the bulk of the index by at least an order of magnitude.

Also in order to reduce the bulk of the index, terms or combinations of terms having more than, for example, fifty document numbers, will not be listed in the index.

That means that generally single terms or combinations of two will not be listed.

This will cause slight inconvenience if searches by a single term or combination of two are required. For example, instead of finding all document numbers of a single term at one place and in numerical sequence, they will have to be found by going down the pages that have that term combined with other terms. This will give all of the required document numbers. However, they will not be in numerical sequence, and there will be a large proportion of duplication. Thus such searches will be possible. However, in general they should not be performed at the user location but at the center by the computer.

Besides the rule of maximum postings discussed above, there will be a minimum posting rule saying that combinations of terms having less than, for example twenty-five documents will not be listed. This rule will not materially affect the search convenience but will help reduce the bulk and cost of the index.

There is one exception to the rule. If the listing has X terms and a document has been indexed by Y terms, this document number should, of course, not be listed if $X \geq Y$.

Details of the index

The index is generated by the computer. Each new document is entered by its document number and the numbers of the terms by which is has been indexed. These term numbers are then combined in all possible combinations and listed in ascending numerical sequence as shown in FIG. 1.

Periodically these document-term data are inverted by the computer into term-document data printed out in the form shown in FIG. 2 and microfilmed. This will further be referred to as the Index. The inversion is a simple sorting process well known in the data processing art.

Besides the microform index, each user may receive a list of terms in hardcopy and a guide to the microform index telling the user on which microfilm sheet and which position on each sheet to consult for a particular term combination (see FIG. 3).

The third component the user may receive is a Title With Indicative Abstract Listing. This is a simple linear listing by document number in ascending numerical sequence. It is visualized that ten such abstracts will go on one page, and that this listing will go on the same type of microfilm sheets as the index.

It is also possible to provide Standard Document Sheets, comprising one page for every document, giving title, index terms, source, author, abstract conclusions, recommendations, references, etc. This can also be reduced to the same microform.

It is visualized that complete documents will be furnished upon demand by the center only after the user has exhausted all of the possibilities of the disseminated system, made a thorough search and narrowed down his requirements (by reading abstracts, etc.) to a limited number of documents. These could then be reproduced from 16 mm. microfilm in hardcopy, for example, by a continuous Xerographic process. It is, of course, also possible to give the user the complete document collection on the same microfilm medium.

Systems requirements of the proposed microfilm system

As discussed earlier the dissemination will comprise the following components:
  (1) Access Guide in hard copy.
  (2) Index on microsheets.
  (3) Guide to the Index—this could be on hardcopy. However, since the guide may be quite bulky, it could also be reduced to microform.
  (4a) Title Cum Indicative Abstract Listing—this could be reduced to microform with, for example, ten units to one frame of microfilm.
  (4b) This may be replaced by Standard Document Sheets. This will also be reduced to microform.

In the preparation of this disseminable material the following forms of screening operations may have to be performed:
  (A) Screening by security classifications.
  (B) Screening by proprietary interests.
  (C) Screening according to need-to-know.
  (D) Screening according to: "Interest profiles" of persons or organizations.

It is expected that, generally speaking, the access guide and index can remain unclassified. However, it is possible that in certain cases certain terms in the access guide and the index will be classified. These will, however, be very few in number. This could, for example, be taken care of by making an unclassified access guide and index by leaving certain spaces blank. Thus the unclassified and classified versions can utilize the same document accession numbers.

Of course, the title and abstract listing (4a) or the standard document sheet listing (4b) will have to be screened by the four different forms of screening listed above or combinations of the same.

The programs for these screening actions will have to be prepared on the computer. These programs can then be entered on punched cards. According to the invention, these punched cards can be used to program the camera that performs the data input.

Special indexes

The proposed system will furnish a maximum of flexibility to provide special indexes comprising small sections of the main collection.

For smaller collections it is possible to utilize permutations of terms, as well as combinations and utilize titles and abstracts instead of document numbers, in the index. Many other types of alpha-numerical indexes are possible, all of which could be entered in the microform system.

Outline of microfilm system

The index will be computer generated, printed out on tabulation sheets by the computer and microfilmed. These tab sheets will be reduced to a microform matrix of, for example, 100 x 100 frames and 12 frames per inch. This requires an active area of 8.25" x 8.25". Reduction ratios will then be about 120/1. This will reduce one page of hardcopy to one page of microfilm. Of course, a quite different matrix than 100 x 100 could also be used.

FIG. 4 shows a perspective view of the camera. It is completely automatic and can expose images at any of 10,000 positions on the piece of film. The positioning is controlled by punched cards.

The input is from microfilm, rollfilm such as 35 mm. film or hardcopy. The 35 mm. projection system has a mechanism to count frames and position them accurately. It is controlled by the punched card reader.

Thus the positioning mechanism that controls the position where the image is going to be exposed on the microsheet, as well as the selection of the image from the 35 mm. film, are all automatically programmed by the punched card reader.

FIGS. 7 through 10 show a number of possible configurations of reproducers to make positive dissemination copies from the negative, generated by the punched card controlled automatic camera. It utilizes pressure for better contact between negative and unexposed film, and exposes by means of parallel light.

Integration with peekaboo type search systems

FIGS. 11, 12, 13, 14, 16 and 17 show how the proposed microfilm system can be combined with an optical coincidence search system, such as are well known in the art.

Systems of this nature utilize a card dedicated to each of the terms of the vocabulary. Each card has a position dedicated to one of the documents. This dedication could be based on an x–y coordinate system. Systems of this nature are known as peekaboo systems. Commercially they are known as Termatrex Systems.

Figure 11:
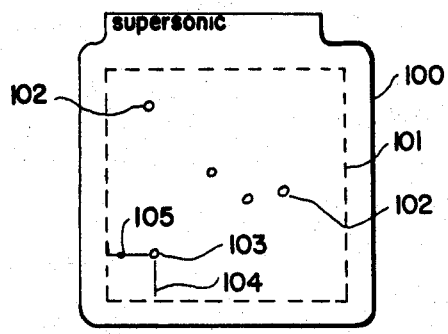
FIG. 11 shows an example of a term card.

FIG. 11 shows such a termcard, 100, dedicated to the card "supersonic." The area 101 could have a matrix of, for example, 100 x 100 dedicated positions. Numerals 102 designate holes in this card 100. If the coordinates 104 and 105 of hole 103 are respectively equal to 35 and 25 dedicated positions, hole 103 pertains to document #3525. This means that document #3525 has been indexed by the term "supersonic."

In a search for, for example, supersonic flow in nozzles, the termcards "supersonic," "flow" and "nozzles" are superimposed over a lightbox. Coinciding holes visible as light dots then designate the desired documents.

Figure 12:
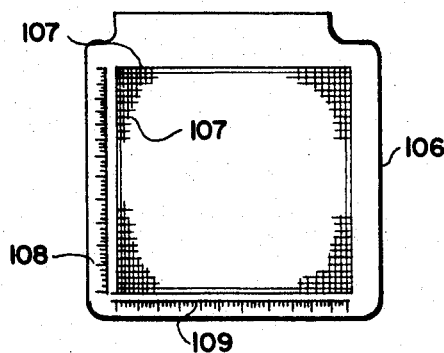
FIG. 12 shows an example of a micro-image overlay.

According to the invention, the proposed microfilm system and the optical coincidence system can be integrated by utilizing the same dedication spacing. It is then possible to place the documents in microform on an overlay sheet, FIG. 12 shows such as overlay sheet 106, having 100 x 100=10,000 microform pages 107 each pertaining to documents.

Figure 13:
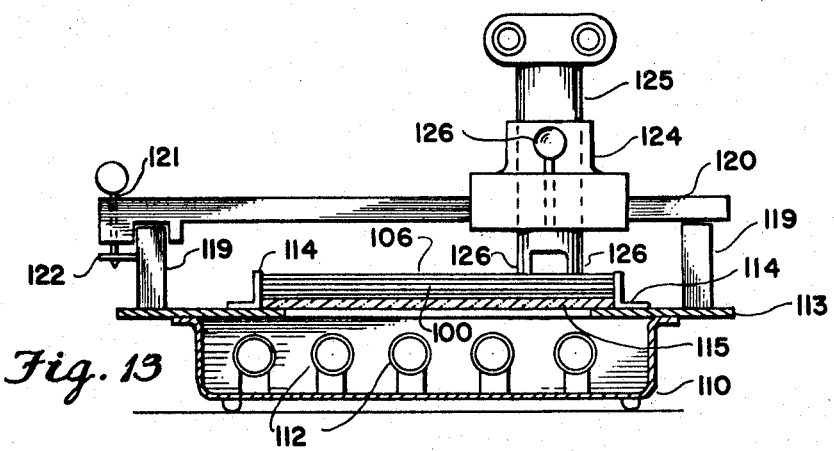
FIG. 13 shows a viewer for this overlay when used with optical coincidence cards.

FIG. 13 shows a cross section of the search device. A lightbox 110 contains, for example, fluorescent light 112. A top 113 mounted on this lightbox, has a number of alignment clamps 114. Within these clamps 114 a translucent plate 115 is fitted. On top of this as many termcards 100 can be placed as make up a search question. On top of these the overlay 106 can be placed.

Thus each of the positions of the termcard 100 corresponds to a frame on the overlay 106. Scales 108 and 109 allow the coordinates of spots where light shows through coinciding to be read off. It is then possible to place a carriage of a microscope type reader above these positions. For this purpose, the top 113 has two rails 119 mounted on it. A cross carriage 120 is slidably mounted on these rails and can be locked in each of the 100 positions of the matrix of 100 x 100 by means of pin 122 cooperating with a row of holes 122.

Slidably mounted on the cross carriage 120 is viewing carriage 124. It can also be locked in each of the 100 positions along the other side of the matrix. Mounted in viewing carriage 124 is the binocular microscope viewer 125. It can slide up and down vertically and rest on the overlay 106 by means of legs 126. The configuration of the device of FIG. 13 is similar to that of U.S. patent application No. 579,110, April 1956. FIGS. 1, 2, 3, 4, 5, 6, 7, 8, 9 and 10 (Patent No. 3,052,150, Sept. 4, 1962), except that the drill is removed from the carriage 124 and replaced by the viewer 125. This part of the present invention, therefore, constitutes a continuation in part of the above invention.

Figure 14:
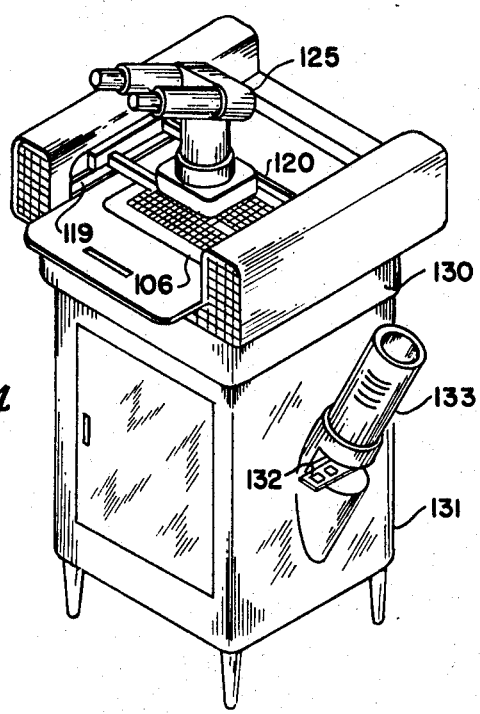
FIG. 14 shows a modification of the installation of FIG. 13.

U.S. patent application No. 153,181, Nov. 1, 1961, describes a search system based on a miniaturized version of the cards of FIG. 11. The viewer is based on magnification of the miniaturized cards and backscreen projection of the same. According to the present invention, it is possible to combine this magnification device with the device of FIG. 13 and remove the lightbox 110 of FIG. 13 and utilize translucent plate 115 for back projection of the miniaturized cards. A device of this nature is shown in FIG. 14. Numeral 100 designates the device of FIG. 13. Numeral 131 designates the viewer of FIGS. 4 and 6 of the above patent application. Numeral 132 designates the holder for the superimposed miniaturized cards and 133, the light source. In using this device the overlay 106 is placed directly on the translucent back projection screen 115. The device of FIG. 14 is a continuation in part of the two aforementioned patent applications.

*Integration of peekaboo search and document storage and readout based on backscreen projection*

The miniaturized version of the cards of FIG. 12, 150 are held in superimposed registration on a holder 151. A collimated light source 152 illuminates the image for projection by the lens assembly 153. An image is formed on rear projection screen 154. To an operator sitting before the device, coincident holes in the records 150 appear as light dots on a dark screen. These light dots are registered to center on grid lines imprinted on screen 154. The X and Y coordinates of a light dot may thus be visually read by the operator.

A microfilm sheet 106 containing 10,000 micro-images of single pages in a 100 x 100 matrix pattern is held in register on glass platen 156. The glass platen 156 is fixed to linear bearing 157, which allows movement in the Y direction along guide rod 158. Guide rod 158 is fixed to linear bearings 159, which allow movement in the X direction on guide rods 160. The guide rods and bearings are arranged to permit rectangular travel of the film 155 to the extreme corners of the 100 x 100 micro-image pattern. A transparent stylus 161 is rigidly attached to the glass platen 156. An operator manually moves the stylus 161 so that its witness mark is directly over a projected light spot. The first page of the corresponding document is thus placed at the optical center of the document projection system.

The document projection system consists of a collimated light source 162, a micro-image projection lens 163, a fixed first surface mirror 164, a movable first surface mirror 165, and a rear projection screen 154. Mirror 165 is hinged and its position is controllable by the operator. When mirror 165 is in position shown in a solid line, the document page is projected on screen 154. When mirror 165 is folded in position shown by the dotted line, the image of records 150 is projected on the viewing screen 154.

The rear cabinet housing 166 telescopes into the front cabinet housing 167 when not in use, for storage purposes. The records 150 mounted on register plate 151 is located by an operator through access opening 168. The film sheet containing micro-image document store 156 is manually loaded by the operator through access door 169.

*Microfilm system*

FIG. 4 shows an external view of the camera. It is controlled by the punched card reader 10 or a punched paper tape reader. The data from this reader go into the electronic control circuitry in the pedestal 13 of the desk. This circuitry controls the servo mechanism of the step-and-repeat camera shown in FIGS. 5 and 6.

A base 20 carries two parallel rails 21. Slidably mounted on these rails is cross carriage 22. It is moved by means of lead screw 24 driven by the servo drive 23. Cross carriage 22 carries two parallel rails 25, which are perpendicular to rails 21. On rails 25 rides film carriage 26, moved by lead screw 29, which is driven by servo drive 27. The film carriage carries the sheet film 30.

The projector 14 could utilize sprocketed film comparable to a motion picture projector. It also features a counter which counts the number of frames that have been moved by the sprocket mechanism. This could, for example, be an electronic decade counter.

Instead of using sprocketed film, it is also possible to utilize unsprocketed film and photograph a code for the serial number of each frame alongside of it. In that case the projector also requires a row of photocells to read this code.

Figure 15:
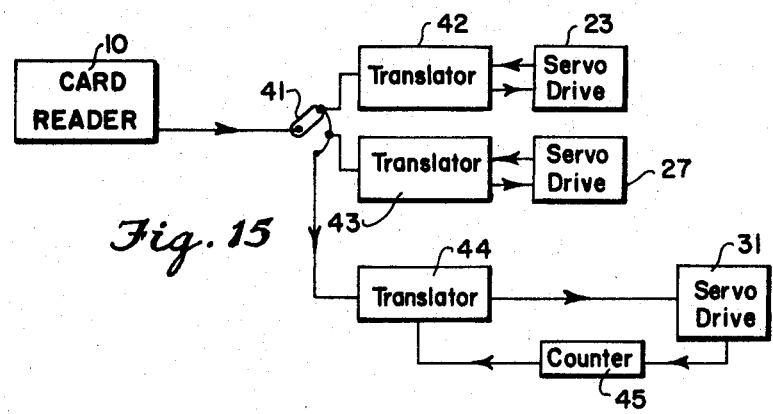
FIG. 15 shows a block diagram of the camera control.
Figure 16:
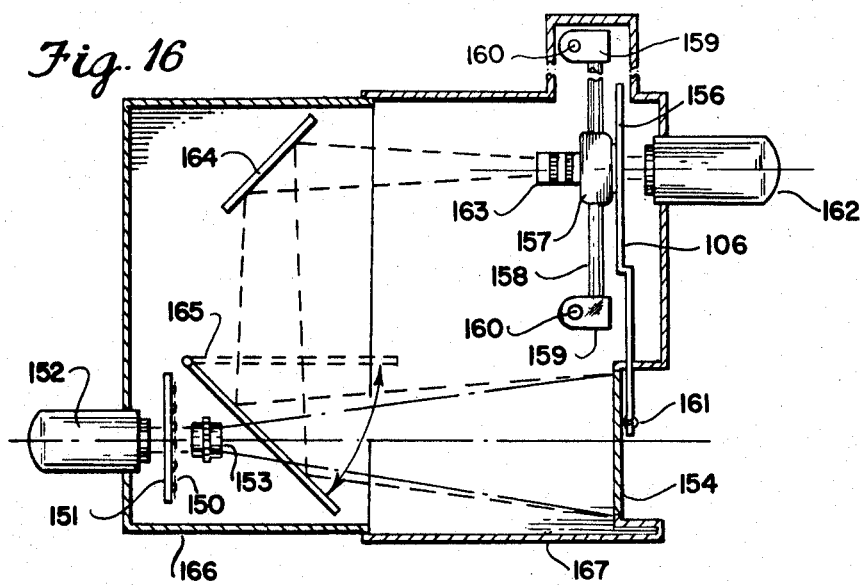
FIGS. 16 and 17 show a modification of the device of FIG. 14.
Figure 17:
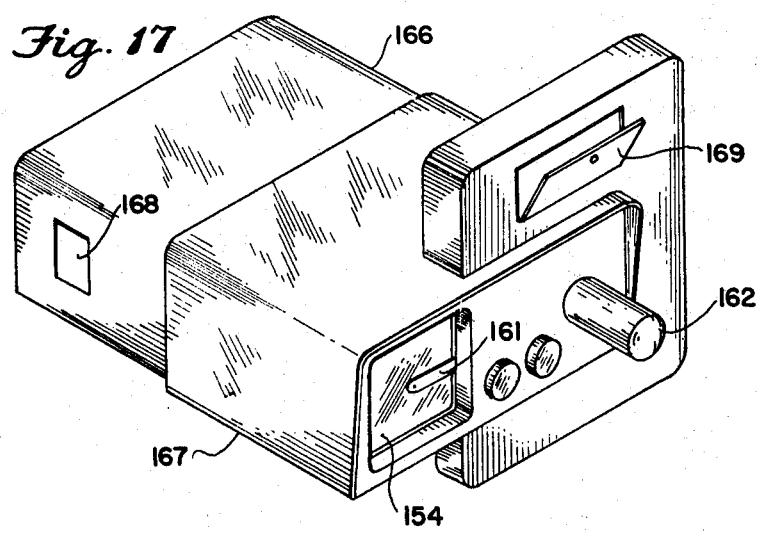

FIG. 15 shows a block diagram of the general arrangement. The card or paper tape or magnetic tape reader 10 gives three readings for each exposure, a commutating device 41 sends these signals respectively to the translator 42 which sends a control signal to the servo drive 23, and to the translator 43 which sends a control signal to servo-drive 29, and to the translator 44 which sends a signal to the servo drive 31 of the projector. The projector in turn drives counter 45 which feeds back a signal into the translator 44.

In this way any frame on the roll film can be projected at any place on the sheetfilm 30.

A keyboard 12 in FIG. 4 can take over the function of the card reader 10 if required.

It is also possible to add hardcopy input. In that case the projector 14, in FIG. 4, is removed. Hardcopy can then be placed on either of the tables 15 and is via mirror 16 projected on the filmsheet. Mirror 16 can be tilted in either of two positions depending on which of the tables 15 is being used.

After a negative has been made and developed as described above, a large number of copies may have to be made. FIGS. 7 and 8 show two sections of a copier. The negative 52 is held on a transparent drum 51 at its edges by suction through holes 53. It covers only a portion of the circumference of the drum. The unexposed film 56 is unwound from one reel 55 and wound on another reel 55. It is pressed against the drum 51 by a soft roller 54. Its bearings slide in a slot 60, which makes it possible to lift this roller off the drum until the negative is back in position to make contact with the unexposed film. The source of parallel light 58 sends a narrow sheet of parallel light sideways into the drum 51. A mirrow 57 reflects it upward to expose the film at the place where it is pressed against the negative by the roller 54. An endless belt 61 made, for example, of stainless steel, runs over stationary rollers 62. This endless belt serves to prevent wrinkling of the film which would result from the contraction and expansion of the roller under pressure.

An alternative arrangement for sheet film instead of roll film is shown in FIG. 9. Here a frame 70 supports a row of rollers 75 on either side. Supported on these rollers 75 runs a carriage 71. In its middle is a transparent plate 72 upon which the negative and the unexposed film will rest. The soft roller 74 presses these together. The endless belt 78 running over rollers 79 again prevents wrinkling of the film. The generator of parallel light 76 throws a narrow slit of parallel light up to the underside of the roller where the exposure takes place.

In the alternative arrangement of FIG. 10 the negative 52 and the unexposed film 56 are pressed together between the stainless steel endless belts 81 and 82 through the medium of the soft rollers 83 and 84. The source of parallel light 85 shows a slit of light 86 on the film which performs the exposure.

Figure 5:
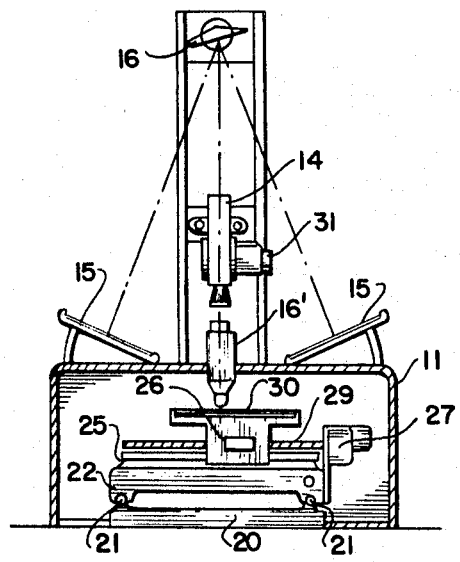
FIGS. 5 and 6 show two cross sections of the installation of FIG. 4.
Figure 6:
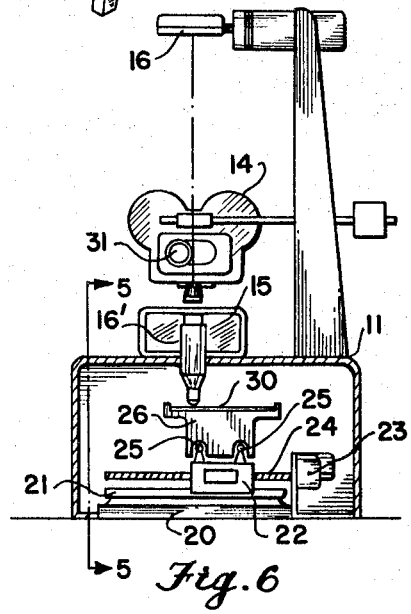

It is also possible to modify the camera system of FIGS. 4, 5 and 6 for hardcopy printout of certain documents from a microfilm sheet. In that case the projector 14 is replaced by a camera. Developed film 30 is illuminated by a source of light from beneath, for example, an electroluminescent screen. The addresses of the frames that will have to be reproduced are punched out in punched cards. The punched card reader 10 in FIG. 4 can then position the microfilm at the desired frames, so that these can then be filmed by the camera. This film can then be developed and a high speed Xerographic printer can convert this film into hardcopy.

The invention is not limited to the examples of possible embodiments given above but encompasses all methods and all devices contained within the claims.

What is claimed is:
1. Photographic apparatus for converting documentary information from hardcopy originals or serial frame microfilms to rectangular matrix arrays or images, or alternatively from rectangular matrix arrays to camera film form, comprising:
  (a) a data card or tape reader for establishing the desired correspondence between successive image positions in the matrix to the order of projection of items of such documentary information,
  (b) a pair of orthogonally-movable carriages, one carried by the other,
  (c) individual servo drives connected to said carriages to establish a matrix position of one carriage relative to a rectangular-coordinate system centered on an optical projection axis, one of said carriages including means for supporting a photographic film sheet,
  (d) means for selectively mounting, in alignment with said optical projection axis, either a serial microfilm camera, a serial microfilm projector, or reflective means for projecting images from hardcopy originals along said axis toward said photographic film sheet,
  (e) and means for translating signals from said reader and for applying them to said servo drives.
2. Apparatus in accordance with claim 1, in which said means (d) mounts a serial microfilm projector including a film servo drive, and which apparatus also includes means for translating signals from said reader and for applying them to said film servo drive, to control the order of succession of projected images.
3. Apparatus in accordance with claim 1, including a light source carried by said one carriage for illuminating a developed film sheet supported by said one carriage.

References Cited
UNITED STATES PATENTS

| | | | |
|---|---|---|---|
| 2,690,696 | 10/1954 | Ashton | 88—24 |
| 3,052,174 | 9/1962 | Berger | 88—24 X |
| 3,260,153 | 7/1966 | Abbott et al. | 88—24 |

NORTON ANSHER, *Primary Examiner.*

RICHARD A. WINTERCORN, *Assistant Examiner.*